Patented Sept. 24, 1935

2,015,239

UNITED STATES PATENT OFFICE 2,015,239

NEW COMPOSITIONS OF MATTER

Walther Schrauth, Berlin-Dahlem, Germany, assignor to E. I. du Pont de Nemours & Company, Wilmington, Del., a corporation of Delaware No Drawing. Application July 11, 1933, Serial No. 679,851. In Germany July 12, 1927

3 Claims. (Cl. 167—94)

This invention relates to new compositions of matter, and more particularly, to compositions comprising a cellulose derivative and, as plasticizers therefor, esters of mononuclear hydrogenated aromatic polycarboxylic acids, and also to compositions comprising a perfume and, as fixatives therefor, esters of mononuclear hydrogenated aromatic polycarboxylic acids. The present invention is a continuation in part of applicant's copending application Serial No. 229,260, filed October 27, 1927, "Compounds for softening and gelatinizing plastic masses and for dissolving or fixing odoriferous substances."

It is an object of the present invention to provide new cellulose derivative compositions having advantageous properties. A further object is to provide new plasticizers for cellulose derivatives useful in the coating and plastic arts. Another object is to provide cellulose derivative coating and plastic compositions having improved water resistance and durability. A still further object is to provide perfume compositions of greater permanence. Other objects will appear hereinafter.

The above objects are accomplished according to the present invention by employing esters of mononuclear hydrogenated aromatic polycarboxylic acids as plasticizers for cellulose derivatives and as fixatives for perfume compositions.

The esters forming the plasticizers and fixatives of the present invention may be prepared by reacting hydrogenated aromatic polycarboxylic acids, their anhydrides or chlorides, with alcohols, or the acid chlorides with alcohols or phenols, or the alkali salts with alkyl halides. Certain of the esters may also be prepared by reacting esters of unsaturated acids, such as maleic or acrylic acids, with conjugated dienes such as butadiene. The particular method of preparing the esters is immaterial as far as the present invention is concerned, but the following examples are given to illustrate simple methods of preparing the esters particularly valuable in the present invention:

Example 1

Dicyclohexyl hexahydrophthalate:—A mixture containing 350 g. hexahydrophthalic acid, 300 g. cyclohexanol, 300 g. ethylene dichloride, and 2 cc. sulfuric acid was heated to boiling in an apparatus designed to separate the water from the distillate and return the ethylene dichloride to the reaction flask. Distillation was continued until the theoretical amount of water had been removed. The product was washed with sodium carbonate solution to remove the acid and then refined by heating under vacuum in the presence of decolorizing carbon until the temperature reached approximately 200° C. at reduced pressure. After filtering to remove the carbon the product was substantially water white and contained only a trace of unreacted alcohol.

Example 2

Dicyclohexyl chloro-4-tetrahydro-1,2,3,6-phthalate:—A mixture containing 94 g. cyclohexyl maleate and 75 g. chloroprene was warmed to 50° C. for an hour and then allowed to stand overnight. The product was treated with boiling water to distill out unreacted chloroprene and then refined as described in Example 1. The product was substantially water white.

Example 3

Dibenzyl tetrahydrophthalate:—A mixture containing 15 g. tetrahydrophthalic acid (prepared by reacting maleic acid with butadiene) and 20 g. benzyl alcohol was refluxed for 8 hours. The product was washed with sodium carbonate solution until neutral and then refined as in Example 1.

The esters coming within the scope of the present invention are substantially all liquids varying from water white to light amber in color. They are high boiling, compatible with cellulose derivatives and resins, and readily soluble in the usual lacquer solvents.

The acids of the dicarboxylic acids, for example, those of hexahydrophthalic acid, have proved to be especially useful as plasticizers and fixatives. Particularly useful esters are also those of the acids produced by oxidizing hydronaphthols and hydronaphthones, or the product obtained by oxidizing partially hydrogenated naphthalenes containing one fully hydrogenated ring. Thus, by oxidizing betadecahydronaphthol, or the corresponding ketone, by means of nitric acid, a mixture is obtained consisting substantially of the cis- and trans-isomeric hexahydrophenylene-diacetic acid, together with orthocarboxyoctahydrocinnamic acid. The esters of the different acids produced by this oxidation and separated by crystallization, as for example, the ethyl, isobutyl, benzyl, or cyclohexyl esters, as well as mixtures thereof, make excellent plasticizers. Thus, by oxidizing betadecahydronaphthol and esterifying the resulting acids by means of ethyl alcohol, there is obtained a liquid boiling at 175-185° C. at a pressure of 20 mm. and having a very faint odor. The corresponding mixture of isobutyl esters boils at 185-200° C. at 18 mm. pressure, is slightly yellowish in color, and is almost odorless.

The ethyl ester of hexahydrophenylenediacetic acid is perfectly colorless and boils at 180-182° C. at 20 mm. The isobutyl ester has a very faint odor and boils at 200-204° C. at 22 mm. Even small quantities of these esters are capable of increasing plasticity to a considerable extent, so that they may be advantageously employed for the above mentioned purposes.

In addition to the hydrogenated aromatic polycarboxylic acids mentioned above, hexahydroisophthalic, hexahydroterephthalic, tetrahydroisophthalic, tetrahydroterephthalic, tetrahydrouvitic, dihydrouvitic, methyltetrahydrotrimesic, tetrahydropyromellitic, hexahydromellitic, and cyclohexene-1-dicarboxylic-1,2 acids may be used. In making certain of the esters care must be used, for example, esters are most conveniently obtained from hexahydromellitic acid by reacting a metal salt thereof with an alkyl halide. The hydrogenated aromatic polycarboxylic acids disclosed in British Patents 300,130, 324,661, and 325,669, German Patents 500,160 and 502,043, and French Patent 672,025 may likewise be used.

Other alcohols than those above mentioned may be used, including methyl, ethyl, propyl, butyl, heptyl, lauryl, fenchyl, bornyl, menthyl, amyl, hexyl, and crotyl. Phenol esters may be made from the alkali phenolate and the acid chloride and thus naphthyl, phenyl, cresyl, thymyl, eugenyl, and other esters may be employed.

This invention relates broadly to the use of esters of hydrogenated mononuclear aromatic polycarboxylic acids. In the case of the incompletely hydrogenated acids, it is preferred that the alcohol have at least three carbon atoms. Cellulose derivative compositions comprising esters derived from such alcohols have superior water resistance and decreased volatility. In compositions comprising cellulose acetate and other organic acid esters of cellulose, it is preferred to use esters of alcohols having not more than seven carbon atoms, in view of the greater compatibility of these esters with the cellulose derivatives. In general, esters derived from alcohols having from three to seven carbon atoms are preferred. Because of their saturated nature esters of completely hydrogenated acids are preferred to the esters of only partially hydrogenated acids.

Typical coating compositions containing esters of mononuclear hydrogenated aromatic polycarboxylic acids as plasticizers are given in the following examples:—

Example 4

| | Parts |
|---|---|
| Cellulose nitrate | 12 |
| Dammar | 3 |
| Dicyclohexyl hexahydrophthalate | 4 |
| Castor oil | 2.6 |
| Solvent | 166 |

Example 5

| | Parts |
|---|---|
| Cellulose nitrate | 12 |
| Dammar | 4 |
| Dilauryl tetrahydrophthalate | 6.6 |
| Solvent | 166 |

Example 6

| | Parts |
|---|---|
| Cellulose acetate | 12 |
| Dicyclohexyl chloro-4-tetrahydro-1,2,3,6-phthalate | 6 |
| Solvent | 182 |

Example 7

| | Parts |
|---|---|
| Cellulose nitrate | 12 |
| Pigment | 16 |
| Oil | 3½ |
| Resin | 3½ |
| Benzyl butyl tetrahydrophthalate | 4 |
| Solvent | 181 |

Example 8

| | Parts |
|---|---|
| Cellulose nitrate | 10 |
| Resin | 6 |
| Di-methylcyclohexyl camphorate | 6 |
| Wax | 2 |
| Solvent | 170 |

The coating compositions above give films which dry in a few minutes. By the term "solvent" as used in the above examples is to be understood suitable mixtures of esters, alcohols, and hydrocarbons, such as would be obvious to those skilled in the art.

Typical plastic compositions according to the present invention are listed in the following examples:

Example 9

| | Parts |
|---|---|
| Cellulose acetate | 100 |
| Benzyl methyl hexahydrophthalate | 30 |

Example 10

| | Parts |
|---|---|
| Cellulose nitrate | 100 |
| Dicyclohexyl tetrahydroterephthalate | 60 |
| Pigment | 200 |

Example 11

| | Parts |
|---|---|
| Ethyl cellulose | 100 |
| Dibenzyl hexahydrophthalate | 15 |

The above plastic compositions may be prepared with or without the usual volatile solvents, that is, alcohol with cellulose nitrate compositions, acetone with cellulose acetate compositions, and toluene-alcohol with cellulose ether compositions.

It is to be understood that in all of the above examples other cellulose derivatives may be used, including cellulose propionate, cellulose butyrate, cellulose acetobutyrate, benzyl cellulose, and the like. Likewise part of the plasticizers in the above examples may be replaced by other plasticizers coming within the scope of the present invention, or by one or more of the heretofore known plasticizers, such as triacetin, camphor, dibutyl phthalate, tricresyl phosphate, et cetera. If exceptional moisture proofing characteristics are desired, waxes or waxy resins may be incorporated in these compositions. Other resins than dammar, for example, ester gum and other natural and synthetic resins, may be used in the lacquer and plastic compositions disclosed above.

These esters may also be used as plasticizers and/or softeners for natural resins such as dammar, sandarac, Congo, elemi, guaiac, kauri, rosin, et cetera, and synthetic resins such as polyhydric alcohol-polybasic acid resins, phenol-aldehyde resins, urea-formaldehyde resins, vinyl resins, ester gums, ether resins, et cetera. They may be used alone or in combination with other modifiers for the resin, such as waxes.

The plasticizers herein disclosed may be used in the preparation of all types of cellulose derivative compositions. They may be used to excellent advantage in the preparation of lacquers for coating metal and wood, dopes for coating fabrics, moisture proofing lacquers for coating regenerated cellulose sheets and paper, and in plastic compositions to be used in the preparation of toilet ware novelties, sheeting, rods, tubes, safety glass interlayers, and similar uses.

Furthermore, esters of mononuclear hydrogenated aromatic polycarboxylic acids, and particularly those of hexahydrophthalic acid, hexahydrophenylenediacetic acid, orthocarboxyoctahydrocinnamic acid, with aliphatic, aromatic, or alicyclic alcohols, or mixtures of such esters, are highly suitable for dissolving or fixing odoriferous substances, for example, oil of lavender, oil of bay, oil of bergamot, oil of jasmine, oil of neroli, irone, oil of sandalwood, oil of thyme, and the like. These esters form products having a high boiling point and are, even in small quantities, capable of absorbing odoriferous substances. Their adaptability for dissolving and fixing odoriferous substances and perfumes is greatly increased by the fact that they possess a very faint, agreeable odor.

One of the advantages of the esters herein disclosed for use as plasticizers lies in their extremely low vapor pressure and their water resistance. Because of these properties, compositions containing these esters have excellent durability and resistance to water.

As many apparently widely different embodiments of this invention may be made without departing from the spirit and scope thereof, it is to be understood that the invention is not limited to the specific embodiments thereof except as defined in the appended claims.

I claim:

1. A composition of matter comprising a perfume and, as a fixative therefor, an ester of a hexahydrophthalic acid.

2. A composition of matter comprising a perfume and, as a fixative therefor, an ethyl ester of hexahydrophthalic acid.

3. A composition of matter comprising a perfume and, as a fixative therefor, a diethyl hexahydrophthalate.

WALTHER SCHRAUTH.